(12) United States Patent
Florence

(10) Patent No.: US 7,356,337 B2
(45) Date of Patent: Apr. 8, 2008

(54) DIALING SERVICES ON A MOBILE HANDSET AND REMOTE PROVISIONING THEREFOR

(75) Inventor: Shahar Florence, Shoham (IL)

(73) Assignee: StarHome GmbH, Zurich (CH)

( * ) Notice: Subject to any disclaimer, the term of this patent is extended or adjusted under 35 U.S.C. 154(b) by 0 days.

(21) Appl. No.: 11/250,471

(22) Filed: Oct. 17, 2005

(65) Prior Publication Data

US 2006/0068786 A1     Mar. 30, 2006

Related U.S. Application Data

(63) Continuation-in-part of application No. 10/806,281, filed on Mar. 23, 2004.

(60) Provisional application No. 60/618,987, filed on Oct. 18, 2004.

(51) Int. Cl.
*H04Q 7/20* (2006.01)
*H04M 1/00* (2006.01)
*H04M 3/00* (2006.01)

(52) U.S. Cl. ................. 455/432.2; 455/432.1; 455/432.3; 455/435.2; 455/419; 455/422.1; 455/550.1

(58) Field of Classification Search .. 455/432.1–432.3, 455/435.1–435.3, 422.1, 424–425, 433–434, 455/436–451, 456.1, 456.2, 456.3, 456.5, 455/456.6, 460–461, 466, 515, 524–525, 455/550.1, 557–558, 560–561, 415–420, 455/41.2, 414.1, 414.4, 551, 552.1, 553.1, 455/556.1, 556.2; 370/328, 338, 349, 396; 379/216.01, 355.05, 355.06
See application file for complete search history.

(56) References Cited

U.S. PATENT DOCUMENTS

| | | | |
|---|---|---|---|
| 5,564,068 A | 10/1996 | Nguyen | |
| 5,950,130 A | 9/1999 | Coursey | |
| 5,999,811 A * | 12/1999 | Molne | 455/432.3 |
| 6,122,503 A | 9/2000 | Daly | |
| 6,122,510 A * | 9/2000 | Granberg | 455/433 |
| 6,148,197 A | 11/2000 | Bridges et al. | |

(Continued)

FOREIGN PATENT DOCUMENTS

EP    889661    7/1999

(Continued)

OTHER PUBLICATIONS

ETSI—GSM "Digital Cellular Telecommunications system (Phase 2+) (GSM); Universal Mobile Telecommunications System (UMTS); Mobile Radio Interface Layer 3 Specification, Core Network Protocols—Stage 3" —(3G TS 24.008 version 3.2.1. Release 1999).

(Continued)

*Primary Examiner*—Meless Zewdu

(57) ABSTRACT

A mobile communication device such as a mobile telephone comprises: a communication management module configured to use logic in order to manage communication, for example, correct dialing sequences, translate short codes between networks, set preferences for connecting to roaming networks etc.; and an update unit which obtains data from the network in order to update the logic at the phone so that the communication management is carried out at the telephone based on dynamically updated data. The invention is particularly applicable to roaming users.

25 Claims, 4 Drawing Sheets

U.S. PATENT DOCUMENTS

| | | | |
|---|---|---|---|
| 6,223,028 | B1 | 4/2001 | Chang et al. |
| 6,345,184 | B1* | 2/2002 | van der Salm et al. .. 455/432.2 |
| 6,411,807 | B1 | 6/2002 | Amin et al. |
| 6,560,455 | B2 | 5/2003 | Amin et al. |
| 6,564,055 | B1* | 5/2003 | Hronek ................ 455/433 |
| 6,735,434 | B2 | 5/2004 | Criss et al. |
| 6,965,781 | B1 | 11/2005 | Lewis |
| 7,072,651 | B2* | 7/2006 | Jiang et al. ............ 455/432.1 |
| 7,089,001 | B2* | 8/2006 | Leung et al. ............ 455/433 |
| 7,113,764 | B1* | 9/2006 | Jang et al. ............ 455/404.1 |
| 2002/0147012 | A1 | 10/2002 | Leung et al. |
| 2002/0164983 | A1* | 11/2002 | Raviv et al. ............ 455/432 |
| 2002/0193127 | A1 | 12/2002 | Martschitsch |
| 2004/0087305 | A1 | 5/2004 | Jiang et al. |
| 2004/0176092 | A1* | 9/2004 | Heutschi ............ 455/435.1 |
| 2004/0192306 | A1 | 9/2004 | Elkarat et al. |
| 2004/0203757 | A1 | 10/2004 | Nasilski |
| 2004/0204117 | A1* | 10/2004 | Weiner ............ 455/564 |
| 2004/0224680 | A1 | 11/2004 | Jiang |
| 2005/0003803 | A1* | 1/2005 | Buckley ............ 455/414.1 |
| 2005/0070278 | A1 | 3/2005 | Jiang |
| 2005/0101323 | A1* | 5/2005 | De Beer ............ 455/435.2 |
| 2005/0186950 | A1 | 8/2005 | Jiang |

FOREIGN PATENT DOCUMENTS

| | | |
|---|---|---|
| EP | 1463366 | 9/2004 |
| WO | WO 98/23108 | 5/1998 |
| WO | WO 2004/014101 | 2/2004 |
| WO | WO 2004/075484 | 2/2004 |
| WO | WO 2004/075579 | 2/2004 |
| WO | WO 2004/075598 | 2/2004 |
| WO | WO 2005/017693 | 2/2005 |
| WO | WO 2005/018245 | 2/2005 |
| WO | WO 2005/081962 | 9/2005 |
| WO | WO 2005/086927 | 9/2005 |

OTHER PUBLICATIONS

ETSI "Universal Mobile Telecommunications system (UMTS); NAS Functions related to Mobile Station (MS) in Idle Mode" —(3G TS 23.122 version 3.1.0. Release 1999).

* cited by examiner

DIALING SERVICES ON A MOBILE HANDSET AND REMOTE PROVISIONING THEREFOR

RELATED APPLICATIONS

The present application is a Continuation-In-Part (CIP) of U.S. patent application Ser. No. 10/806,281, filed on Mar. 23, 2004. This application also claims the benefit of U.S. Provisional Patent Application No. 60/618,987, filed on Oct. 18, 2004. The contents of the above Applications are all incorporated herein by reference.

FIELD AND BACKGROUND OF THE INVENTION

The present invention relates to dialing services being provided at a mobile handset and remote provisioning therefor, and, more particularly, but not exclusively to such dialing services when configured for roaming users.

The services are mainly in the area of dialing, and are covered by previous patent applications, including U.S. patent application Ser. No. 09/674,639, and U.S. patent application Ser. No. 09/739,881, the contents of which are hereby incorporated by reference. The main services are ICA (Intelligent Call Assistance or Intelligent Call Completion), HSC (Home Short Code), GDA (Global Direct Access), WWN (World Wide Number) and iVPN (International VPN). Another relevant service is the preferred network for roaming, which is taught in Starhome U.S. patent application Ser. No. 10/806,281, the contents of which are hereby incorporated by reference.

There follow brief comments on some of these services.

Intelligent Call Completion:

Dialing services include intelligent call completion, which comprises correction of wrongly dialed numbers, especially where international dialing is concerned. The service provides for actual automatic correction of the number, or alternatively provides the user with the information he needs to determine that he has dialed wrongly.

The logic for the intelligent call completion requires a set of rules defining how to fix the dialed number, usually based on length and prefix. For roaming, the rules may vary from one country to another, due to local regulations, behavior while an international prefix or the '+' sign is missing, etc. Furthermore the rules will vary for given calling telephones since different roaming users come from different countries. Any gateway carrying an intelligent call completion service firstly has to ensure that calls originating from roaming users are somehow identified and reach the responsible gateway, and then the gateway has to provide rules customized for the different users and their countries of origin.

Home Short Code (HSC):

Another service that is provided to the roamer is the home short code. Different home networks have defined short codes, some of which are defined per network and some of which are defined per country or per group of countries. Thus the short code 911 obtains the emergency services in the USA, whereas 999 is the equivalent in the UK. An Englishman roaming in the United States and requiring the emergency services might attempt to dial 999. Without any attempt at modification the short code he dials will simply not be recognized. The HSC service enables the roamer to use his home network short codes while abroad. Without this service the home short code is not recognized by the visited network and the call is rejected. With the above service the network uses logic, located at a gateway, to recognize the short code and deal with it appropriately. Thus a home short code for calling voicemail can be recognized and the user connected to his home voicemail. A home short code for calling the emergency services can be recognized and translated into the local short code for calling the emergency services. Thus in both cases the user dials the short code he is used to and he is provided with the service he expects.

Now, although the short codes are defined by the home network, not all of them can be enabled for all visited networks (VPMNs). Hereinafter the term VPMN is used for a network that the user is connected to as a roaming user. Sometime there are collisions with local visited network short codes. Thus dialing 999 in the United States would not have the desired effect if the code 999 were in fact dedicated to another service at that network. The call would simply not reach the gateway in the first place.

Furthermore sometimes there may be specific billing issues for some of the numbers. In other cases the VPMN, is willing to enable only some of the home services, perhaps for a limited period of time only. These restrictions result in a situation where the list of home short codes available for the roamer is VPMN dependent and which in fact changes dynamically.

Another service that is provided is the iVPN, or International access to a virtual private network. A virtual private network is typically a corporate network which allows members to call each other on their mobile telephones as if they were extensions on the same switchboard, that is dialing only their extension numbers. International access to such networks requires that somehow the roaming network recognizes the extension numbers as short codes when they are dialed from that given telephone.

In order to combine all the above services, intelligent call correction, home short code and International VPN access, into one package of services, one issue that has to be faced is that of collisions, that is numbers that are ambiguous in the light of two networks being joint points of reference. Any solution is required to implement a common logic for eliminating collisions. A VPN extension can be a home short code as well, and there is a need to identify the collision and determine what is to be the appropriate action. However, as will be appreciated, the collision issue is different for different roaming users. Different users have different home networks and some are members of a VPN and others are not.

Another service is the WWN, or World Wide Number, which enables the roamer to dial for brand names, such as AVIS or HERZ, or to services such as PIZZA or TAXI, and receive the local office of the service provider, irrespective of which country he is dialing in. Such a service is described in greater detail in the above mentioned Starhome patents.

Preferred Network

Preferred network selection is a service implemented, possibly within the telephone SIM card, to select a roaming network from among a list of preferences. The list is stored in the PLMN file and activated during handset power on or during SIM initialization.

One problem with static lists of network preference, that is lists loaded to the SIM before providing the handset to the end user, and which do not get changed subsequently, is that there simply is not enough room on a SIM card to provide enough data for all countries. This is true even if the most unlikely travel destinations are excluded.

Furthermore, static lists, are insufficient because new roaming agreements are signed, tariffs change, and therefore the underlying rationale for treating certain networks as preferred demands that the lists change dynamically.

In addition, the best answer as to which network is preferred may depend on the given user. Network preferences may be community-based, meaning that certain groups of users who may have different priorities may be best served by different preference orders. Prepaid users might have certain preferences and heavy GPRS data users might have other requirements. In the future 3G cellular world there may be a need for different preferences per individual services. Thus the ideal roaming network for voice services may be different from the one that is ideal for data services.

The above-described services are currently typically provided from network servers, gateways, which first identify roaming devices and then route the calls to a dedicated gateway which carries the logic for providing the services. However not all networks have such a gateway and furthermore roaming users are often transferred automatically from one network to another as different networks give stronger and weaker signals. Thus a particular roaming user may arrive in a given country and get used to the fact that he can use his home shortcode for obtaining his voicemail. Subsequently he is transferred to another network and then he discovers that he cannot read his voicemail at all since his new network does not have gateway support.

SUMMARY OF THE INVENTION

According to one aspect of the present invention there is provided a mobile communication device able to communicate over a network and use network services, the communication requiring connecting to a network or issuing a dialing sequence, the device comprising:

a communication management module configured to use logic in order to manage said communication; and an update unit associated with said communication management module for obtaining data in order to update said logic.

According to a second aspect of the present invention there is provided a server for connection to a telephony network comprising:

an update unit for sending configuration data to telephony devices connected to said telephony network, therewith to perform over the air configuration of said telephony devices.

According to a third aspect of the present invention there is provided a mobile communication method comprising:

connecting a mobile communication device to a first network;

modifying an input dialing sequence using configuration logic stored at said mobile communication device; and updating said configuration logic by receiving configuration data over said first network.

According to a fourth aspect of the present invention there is provided a mobile communication method comprising:

Selecting a first network from a list of network preferences located within a mobile device operating environment;

connecting a mobile communication device to said first network; and updating said list by receiving configuration data over said first network into said mobile device operating environment.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
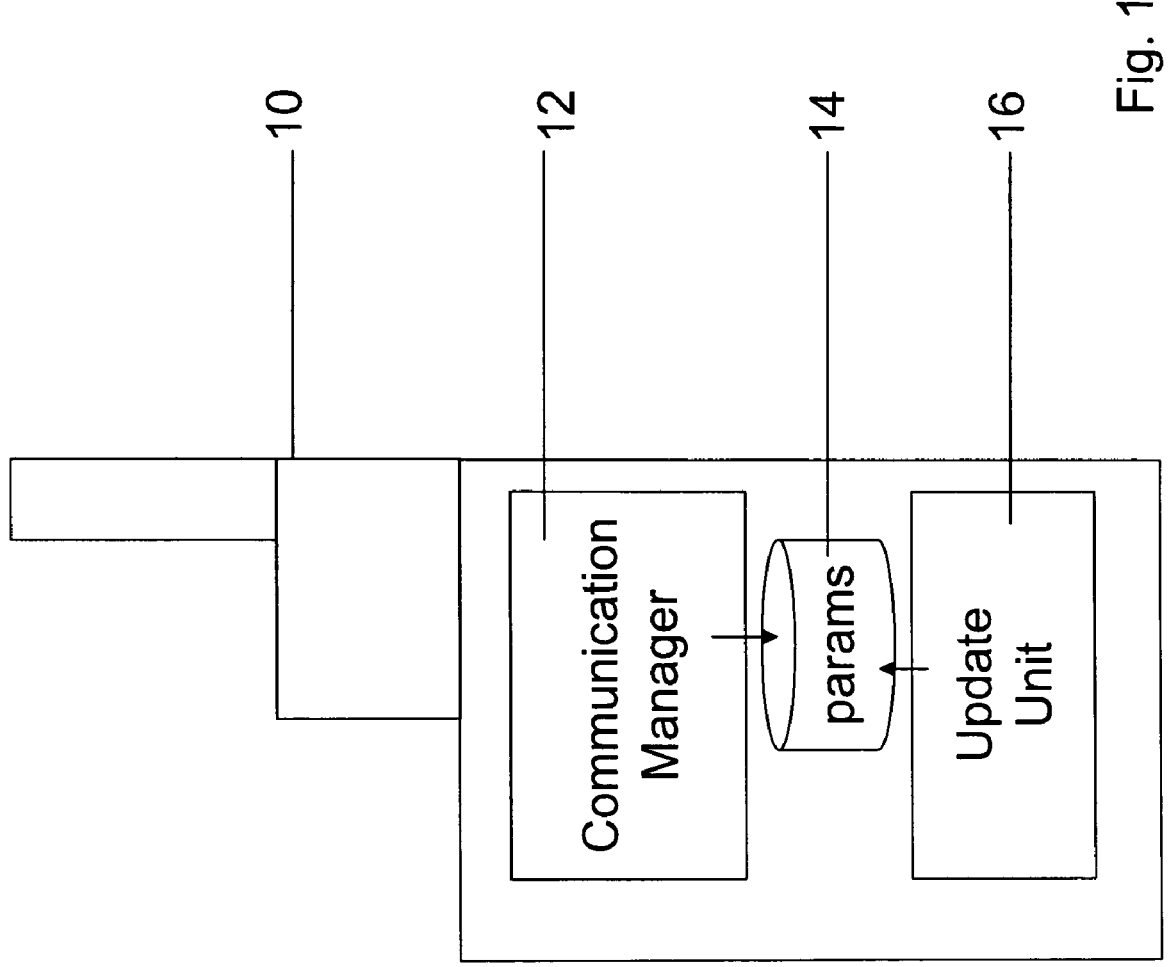
FIG. 1 is a simplified diagram illustrating a cellular communication device with a communication management module incorporated therein as a user client, according to a first preferred embodiment of the present invention.

The present embodiments comprise an apparatus and a method for providing network services to roaming users through a client located on the user's mobile device. The client may be updated via an over the air (OTA) connection from a supporting server.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified diagram showing a mobile communication device 10 which is designed for communication over a network such as a cellular network which may use network services such as voicemail and the like. Communication using such a device generally requires making an initial connection to a network such as a local GSM or CDMA-based cellular network and then issuing a dialing sequence. The dialing sequence may define a particular user it is desired to communicate with or it may define a required service. Codes for defining a service differ between networks or between groups of networks, and the complete dialing sequence for obtaining an end user may differ depending on which network it is being dialed from. Thus dialing from outside the called party's country requires a prefix for the International exchange plus an additional prefix identifying the destination country.

Mobile communication device 10 comprises a communication management module 12 which uses logic from a logic database 14 in order to manage the communication. An update unit 16 obtains data from the network in order to update the logic in database 14.

The communication management unit may select the initial network that the device connects to. The logic comprises rules for selecting a preferred network given more than one available networks. It will be appreciated that when a device is in its home country there is likely to be only one network it is allowed to connect to, namely its home network. However, when the device is away from its home network, say traveling abroad, then numerous networks may be available. The device then has the opportunity to choose which network it wishes to connect to. Most devices simply connect to the network giving the strongest signal. However in accordance with the present embodiments, the logic in database 14 may include rules for selecting a preferred network.

The rules may be based on a list of the networks in order of preference. The update unit allows for the preference order or the selection rules to be updated dynamically over the air. Using the update unit, different preference rules can be set for different telephones. For example a telephone that starts making heavy use of GPRS can be sent one preference order and a telephone that makes mainly voice connections can be given a different preference order.

In one embodiment, the update unit is further configured to set the device to rescan for an available network after its preference list has been updated.

In another embodiment, the logic comprises rules for modifying a dialed sequence. This may be part of any of the services referred to above or of other services. A dialing sequence may be a short code recognized at a home network, and the logic, located within the mobile telephone, may recognize the code and translate it into the equivalent code on the local network. Thus a UK user currently roaming in the United States may dial the sequence 999. The rules recognize 999 as the sequence for the emergency services in the UK, and translate this into 911, the equivalent code for the emergency services in the USA.

In an alternative example the user enters his usual short code for voicemail. The telephone recognizes the home short code for reaching a user's voicemail and knows that the same short code does not apply to the local network. However, this time it is no use simply translating the sequence into the local voicemail short code, because the user's voice mail is not found on the local system but rather on his home system. Therefore the telephone completes the short code into a long number to place as an international call, and enables the dialing sequence to reach the user's voice mail. Thus the user succeeds in accessing his home voice mail, using the dialing sequence that he is used to.

In modifying the dialing sequence, the logic is preferably configured to change the sequence as a function of both a network being currently connected to directly and the home network. In most cases the modification to the dialing sequences simply involves adding prefixes such as International dialing codes, or changing the home number for the International exchange to the local number for the International exchange. As explained, the modification may alternatively involve the exchange or translation of short codes.

Figure 2:
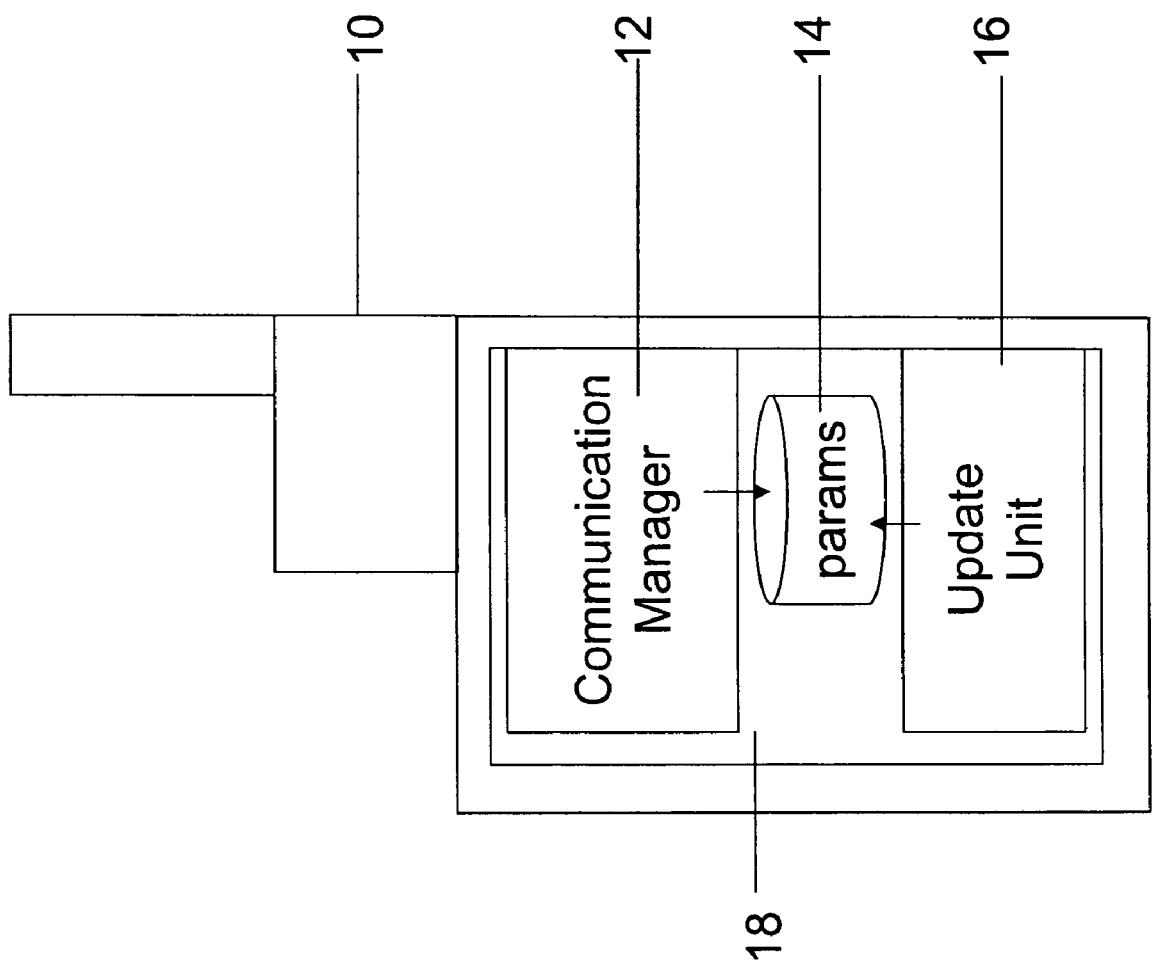
FIG. 2 is a simplified diagram illustrating a variation of the device of FIG. 1 in which the module is incorporated within an operating environment on the mobile device.

Reference is now made to FIG. 2, which is a simplified diagram illustrating the arrangement of FIG. 1 in which the communication manager 12, update unit 16 and parameter database 14 are included within an operating environment 18. The operating environment may be any mobile device compatible operating environment such as Symbian, Java, Brew, Windows for mobile devices etc. Alternatively the communication manager 12, the updated unit 16 and the parameter database 14 may be located within the subscriber identity module (SIM) card 18 of the cellular communication device. The mobile telephone itself includes a central processor which is able to support an operating environment such as those mentioned above, on which it is possible to run user applications. Such an environment can support the communication manager etc without any difficulty. However many telephones, including all GSM telephones, also include SIM cards. The SIM card 18 is a specialist smart card which constitutes a secure environment within the telephone to which access can be controlled and therefore, although it has less computing power than the central processor, is in many ways a more desirable environment for placing the communication manager etc. In particular updating over the air can be carried out more securely than if the manager is placed within the telephone.

Figure 3:
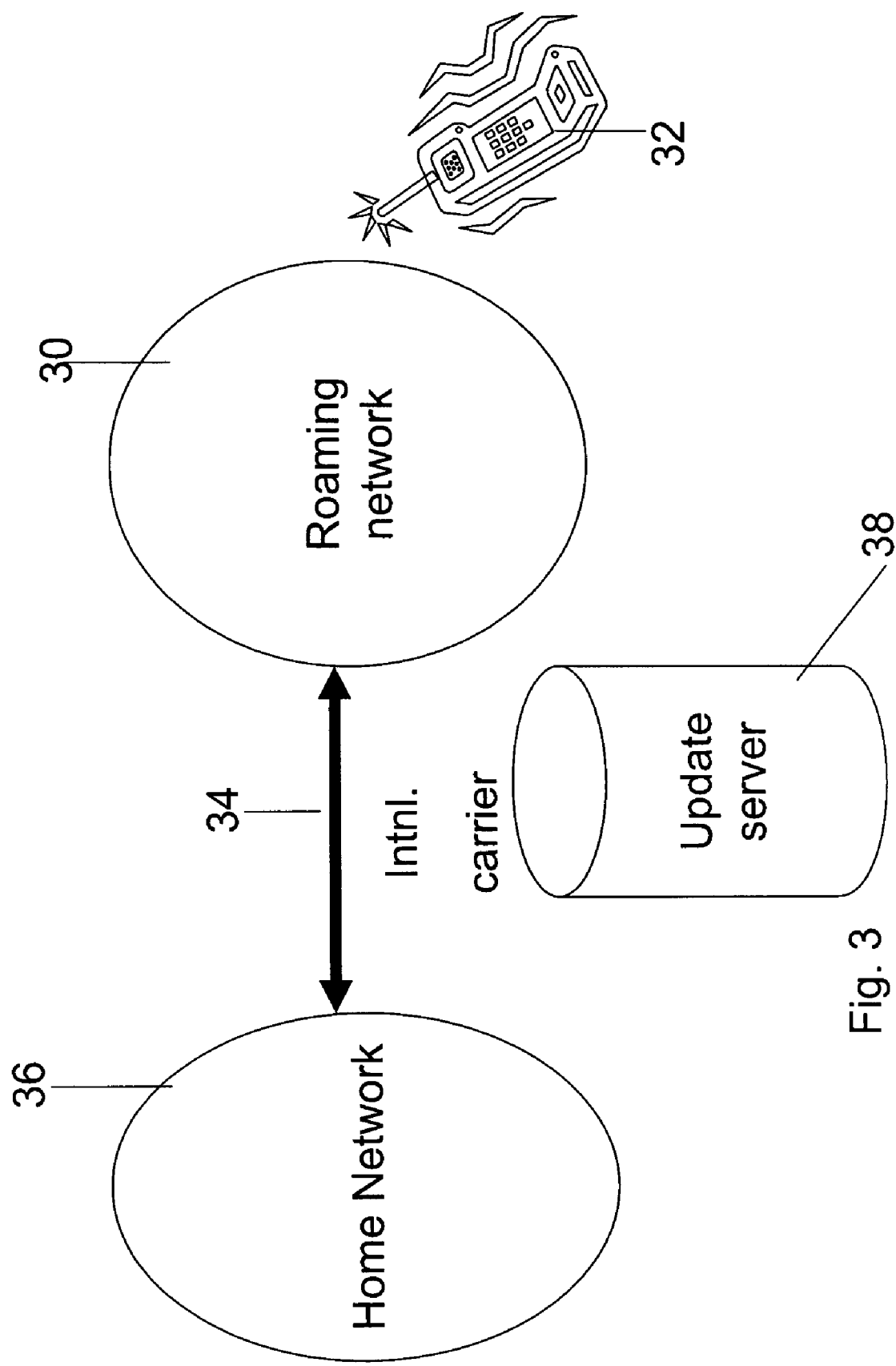
FIG. 3 is a simplified diagram showing the user connecting to a roaming network being distinct from a home network, according to a preferred embodiment of present invention and also showing an update server.

Reference is now made to FIG. 3, which is a simplified diagram that illustrates a first network 30 to which a cellular user 32 connects. The first network is connected via an International link 34 to the user's home network 36. An update server 38 provides over the air support to the cellular user 32.

Now at the first network 30, let us say that the sequence *43 is assigned for voicemail access. Let us further say that at the home network the sequence 151 # is assigned for the same purpose.

Let us also say that the sequence 911 is defined for calling the police at the first network, and the sequence 100 is assigned for the same purpose at the home network.

As the user 32 connects to the first network 30, a series of rules are downloaded to the mobile telephone to enable it to deal with the above circumstance in the manner which most effectively fulfils the requirements of the user. The rules may specify that when the sequence 151# is received it is to have prefix elements added thereto, such as the International exchange for the first network, followed by the country code of the home network 36. In other words the dialing sequence is modified to reach the home network.

In the case of calling the police, the user dials the sequence he is used to, 100. However if he is connecting via a foreign network then it is unlikely that the police in the home country are really intended. Thus it makes more sense to translate the code into the equivalent code at the first network, namely 911. In other words the dialing sequence is modified into another short code which is assigned at the network being currently connected to.

Now in some cases the dialing sequence may have a meaning at both the first network and the home network. The prior art methods in which the dialing sequence correction is carried out at the network is unable to deal with such cases because the call is automatically routed according to the meaning of the sequence at the local network. However as long as the communication manager is located on the phone itself, arbitration rules can be downloaded to the telephone and the necessary arbitration can be carried out at the telephone itself before the dialing sequence is ever issued to the network. Thus the communication management module 12 may be configured by rules downloaded from the server 38 to identify dialing sequences which have one meaning at the first network and a second meaning at the home network 36. Such logic includes one or more prioritizing rules for choosing between the first and second meanings.

Server 38 is connected to a telephone system and includes its own update function for updating telephones over the air. The update function is used to provide configuration rules for mobile telephones to manage their call correction and other services correctly when they move to different countries or because circumstances change.

The configuration data is sent to the receiving telephone and is received by the appropriate user client which recognizes it is configuration data and treats it accordingly.

Figure 4:
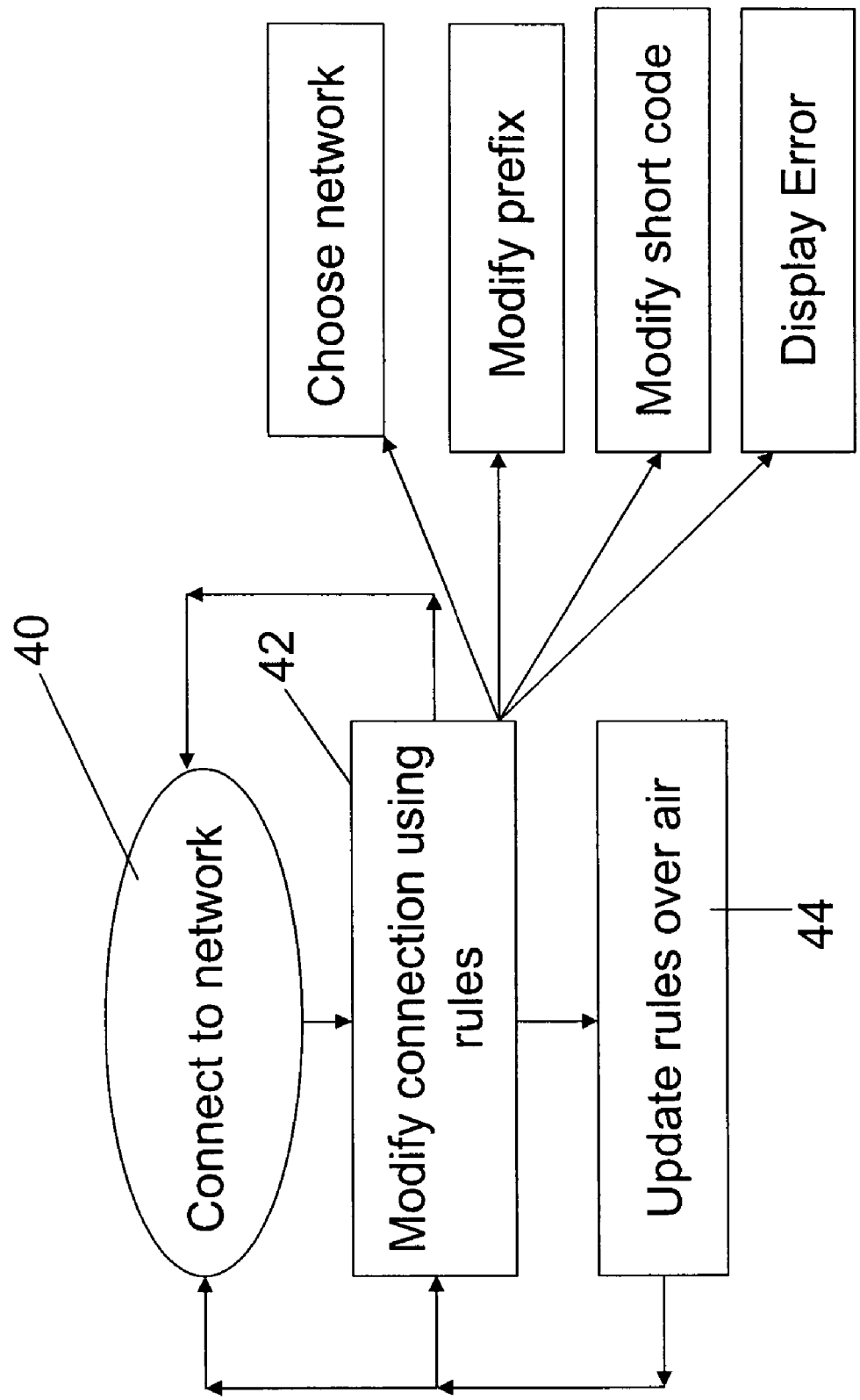
FIG. 4 is a simplified flow chart illustrating the procedure followed at the user client, according to a preferred embodiment of the present invention.

Reference is now made to FIG. 4, which is a simplified diagram illustrating a method of carrying out call and dialing services at the mobile telephone according to a preferred embodiment of the present invention.

Firstly, in a stage 40 the mobile communication device connects to a first network. In a stage 42, the connection is modified using configuration logic stored within the mobile communication device. As shown the modification to the connection may involve translating the dialing sequence so that the destination reached is altered. The modification may involve adding prefixes (or less likely suffixes) to the dialed sequence, or the modification may involve intervening in setting the network to which the cellular telephone connects to. In some cases the modification may in fact include merely providing a prompt to the user to tell him what modification to make.

In stage 44 there is a further stage of updating the configuration logic used in stage 42. This modification is carried out by an over the air (OTA) connection.

As explained above, the known technical implementation of the services discussed herein is carried out on the network itself. In general the implementation is based on service nodes located at the visited and/or home networks, or at a network operations center. The nodes are connected to network resources such as MSC, SMSC and SSP/SCP.

According to the present embodiments, the services, as well as new services, are implemented within the mobile handset itself. As explained a client is located at the handset, whether in the SIM card or within the general processor system of the handset, hereinafter the Mobile Equipment (ME) system. The client is provided and updated using application logic running in server 38 at the back end. By "back end" is meant that the server is connected to the operator's network. The embodiments are for both GSM and CDMA and are more generally applicable to any cellular communication protocol.

The present embodiments make use of a Terminal Management Server (TMS), such as the Terminal Management Server of Nokia Ltd. of Finland in order to carry out over the air provisioning. It will be appreciated that parallel $3^{rd}$ party products may also be used. The TMS preferably enables automatic over-the-air provisioning of mobile phones using Open Mobile Alliance (OMA) standardized technologies for example, or any other standard or proprietary technologies. In addition to OMA Client Provisioning and OMA Device Management open interfaces, the TMS supports the most common device management technologies, enabling operators to manage devices from different manufacturers using one device management solution.

With a solution based on TMS and a local client application, the operator is able to provide its subscribers with a range of dialing services. The services may be provided to roamers and also to local subscribers.

The implementation of the services preferably requires a client program running on the handset, which is first of all able to receive and recognize commands and data from the TMS. Such a client may be a Symbian-based program, or a Java applet or a Brew applet or may be based on the Windows for mobile environment or any other operating system for the mobile environment. Alternatively, the handset built-in capabilities could be used directly. The client may be compatible with the IP multimedia subsystem (IMS), which is a third generation cellular specification that requires all services to be available to roaming users in the same way that they are available to home users.

The following is a partial list of the services that can be supported using the present system.

1. ICA—Intelligent Call Completion: correcting erroneous numbers dialed by roamers, enabling call completion or sending notification explaining how to dial correctly.

The ICA logic requires a set of rules defining how to fix the dialed number, usually based on length and prefix. For roaming, the rules may vary from one country to another, due to local regulations, behavior while an international prefix or the '+' sign is missing, etc. The rules for ICA may typically be downloaded once each time the user registers with a new network, from the TMS. The handset receives the rules and applies them for all dialed numbers. If a particular dialed number matches a rule, the applet either displays a message to the screen notifying an error and explaining to the user how to dial, or completes the call by translating or adding prefixes, or any combination thereof.

2. Home Short Code (HSC):

The HSC service enables the roamer to use his familiar home network short codes while abroad, for example for Voice Mail (VM) access as discussed above. Without such a service the home short code is not recognized by the visited network and the call is rejected.

Although the short codes are defined by the home network, not all of them can be enabled for all visited networks (VPMNs). Sometimes there are collisions with local visited short codes. Sometimes there are billing problems associated with the services provided. In other cases the VPMN is willing to enable only some of the home services, for a certain period of time. These restrictions lead to a situation where the list of home SCs available for the roamer is VPMN dependent and may also be time dependent.

The implementation is generally based on the principle that the handset, through the communication manager 12, performs number translation from the short code into the complete dialing sequence or Long Number. The relevant short codes are downloaded to the handset using the TMS server. The server is typically located at the home network (HPMN), but may alternatively be located at the visited network (VPMN). The server allows the list of short codes and associated rules to be updated dynamically.

3. iVPN—Another service that is provided by the present embodiments is a service similar to HSC, but for VPN corporate extensions, as explained hereinabove in the background. The VPN extensions of the corporate network are downloaded to the handset, and may be updated whenever necessary by the TMS server.

International virtual private network or iVPN—which ensures that VPN extensions are recognized even when abroad, may allow roaming users to easily access their own company VPNs from abroad. Generally the VPN allows users to obtain other users on the same network by simply dialing their extension numbers, and on the home network this is achieved by recognizing that the given user is a member of a given VPN and then connect him to the appropriate VPN gateway. For roaming users the VPN extensions of the corporate network are simply downloaded to the handset, where the communication manager translates them into long numbers and issues them to the network as already modified dialing sequences.

4. WWN—World Wide Number (WWN) enables the roamer to dial for brand names, such as AVIS or HERZ, or to services such as PIZZA or TAXI, and receive the local office of the service provider, irrespective of which country he is dialing in. Such a service is described in greater detail in the above mentioned Starhome patents.

The above services (ICA+HSC+iVPN+WWN) are preferably combined into a single package and the communication manager includes common logic for eliminating collisions. A VPN extension could for example be a home short code as well, or a visited short code, and the logic preferably identifies the collision and determines what action should be taken, as explained above. The logic may for example pre-define which service to select, or it may open an IVR Interactive Voice Response procedure if the handset supports it.

5. Preferred Network

A further surface that can be supported over the air is preferred network selection. Preferred network selection attempts to predefine in some kind of intelligent way what network a roaming user may connect to when switching on his mobile device in a foreign country. The preferred network may be implemented by the SIM card to select a roaming network among a list of preferences. The list of preferences may be stored in a PLMN file and activated during handset power on or during SIM initialization.

As explained in the background, it has been found that static lists are not sufficient. Such static lists are lists that are downloaded onto the SIM before providing the handset to the end user, and never changed since. Static lists are insufficient for several reasons. One is that it is not possible to download sufficient data to cover all countries a user is likely to visit. Secondly, new roaming agreements are signed, tariffs are changed, and the rationale behind the preference list therefore changes. In addition, it may be desirable to provide different lists for different categories of users, for example making the list community-based. Thus prepaid users might have different preferences from GPRS-heavy users. In the future 3G cellular world there may be different networks that are best for different services. Often the preferred roaming network for voice services may be different than the one for data services.

The preferred network feature is thus composed of two elements:

a) Downloading an updated preferred network list, at the home network or per country while roaming using over the air provisioning from a terminal management server.

b) Triggering the handset to re-scan for a higher preferred roaming network (and register to that network). Other SIM files may require an update for supporting this operation, such as the LOCI file, containing the current network the subscriber is registered to.

The TMS may be used to configure the preferred list on the SIM card/handset, and may actually trigger a re-scan by sending a rescan command over the air. As long as the rescan command can be recognized as such by the communication manager then such a strategy will be effective.

It is expected that during the life of this patent many relevant devices and systems will be developed, and protocols will be updated, and the scope of the terms herein, particularly of the terms "cellular", "over the air", and protocols such as "CDMA" and "GSM" is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A mobile communication device having a home network and being able to communicate from a roaming network and use network services at said roaming network, the communication requiring connecting to said roaming network or issuing a dialing sequence, the device comprising:

a communication management module configured to use logic in order to manage said communication, wherein said logic comprises rules for modifying a dialed sequence, wherein said logic is configured to modify said dialed sequence as a function of both said roaming network being currently connected to directly and said home network of said device, wherein said dialed sequence is an assigned short code at said home network of said device and an unassigned short code at said network being currently connected to, and wherein said rules comprise modifying said dialing sequence being unassigned at said current network into a network crossing dialing sequence able to reach said home network thereby to form said home network assigned short code; and an update unit associated with said communication management module for obtaining data in order to update said logic.

2. The device of claim 1, wherein said update device further includes a database of said data to update said logic.

3. The device of claim 1, wherein said update device further comprises communication functionality for obtaining said data to update said logic from a server over said network.

4. The device of claim 1, wherein said logic comprises rules for selecting a preferred network for said device to connect thereto.

5. The device of claim 4, wherein said data comprises a preference order for selecting available networks and said data to update said logic comprises a revision of said preference order.

6. The device of claim 5, wherein said update unit is further configured to set said device to rescan for an available network following said update.

7. The device of claim 1, wherein said data to update said logic comprises a modification of said rules.

8. The device of claim 1, wherein said communication management module is configured to receive temporary control of a voice call, thereby to carry out said modifying of a dialed sequence.

9. The device of claim 1, wherein said logic is configured to modify said dialed sequence as a function of at least two of a network being currently connected to directly, a home network of said device, and a virtual private network with which said device is associated.

10. The device of claim 1, wherein said communication management module is configured to identify dialing sequences which have a first meaning at a network being currently connected to and a second meaning at a home network of said device and wherein said logic comprises at least one prioritizing rule for choosing between said first meaning and said second meaning.

11. The device of claim 1, further comprising a subscriber identity module (SIM) and wherein said communication management module is incorporated within said subscriber identity module.

12. The device of claim 1, further comprising a subscriber identity module and wherein said update unit is incorporated within said subscriber identity module.

13. The device of claim 1, having an internal operating environment, wherein said communication management module is incorporated within said internal operating environment.

14. The device of claim 1, wherein said internal operating environment is any one of the group consisting of the Java operating environment, the Brew operating environment, the Symbian operating environment, and the Windows operating environment.

15. The device of claim 1, wherein said logic further comprises an option of modifying said sequence into another short code that is assigned at said network currently being connected to.

16. A server for connection to a telephony network, said network supporting roaming telephones connected thereto, the roaming telephones each having a respective home network, the server comprising:
an update unit for sending configuration data to telephony devices connected to said telephony network, therewith to perform over the air configuration of said telephony devices, said configuration comprising providing logic, said logic comprising: rules for modifying a dialed sequence, wherein said logic is configured to modify said dialed sequence as a function of both a network being currently connected to directly and said home network of said device wherein said dialed sequence is an assigned short code at said home network of said device and an unassigned short code at said network being currently connected to, and wherein said rules comprise modifying said dialing sequence unassigned at said current network into a network crossing dialing sequence able to reach said home network thereby to form said home network assigned short code.

17. The server of claim 16, wherein said update unit is further operable to remotely configure a manual selection option, therethrough to modify manual selection options for a respective user.

18. The server of claim 16, wherein said update unit and said configuration data are configured for interaction with a client application on a respective telephony device.

19. The server of claim 18, wherein said telephony device is a mobile telephony device.

20. The server of claim 18, wherein said client application is a communication management module configured to use logic in order to manage communication at said telephony device and wherein said configuration data is data for modifying a communication as a function of both of said telephony network and a home network of said device.

21. A mobile communication method comprising:
connecting a mobile communication device to a first roaming network, said roaming network being different from a home network to which said device is registered;
modifying an input dialing sequence using configuration logic stored at said mobile communication device, wherein said logic comprises rules for modifying a dialed sequence, wherein said logic is configured to modify said dialed sequence as a function of both a network being currently connected to directly and a home network of said device wherein said dialed sequence is an assigned short code at said home network of said device and an unassigned short code at said network being currently connected to, and wherein said rules comprise:
modifying said dialing sequence from said unassigned short code into a network-crossing dialing sequence able to reach said home network as said home network assigned short code; and
updating said configuration logic by receiving configuration data over said first network.

22. The method of claim 21, wherein said modifying said input dialing sequence is a function of said first network and a second network, said second network being a home network of said mobile communication device.

23. A mobile communication method comprising:
selecting a first network from a list of network preferences located within a mobile device operating environment;
connecting a mobile communication device to said first network as a roaming network; and
updating said list by receiving configuration data over said first network into said mobile device operating environment, said configuration data comprising rules for modifying a dialed sequence, wherein said rules are configured to modify said dialed sequence as a function of both a network being currently connected to directly and a home network of said device, wherein said dialed sequence is an assigned short code at said home network of said device and an unassigned short code at said network being currently connected to, and wherein said rules comprise:

modifying said dialing sequence unassigned at said current network into a dialing sequence able to cross networks to reach said home network, thereby to form said home network assigned short code.

24. A mobile communication device able to communicate over a network and use network services, the communication requiring connecting to a network or issuing a dialing sequence, the device comprising:

a communication management module configured to use logic in order to manage said communication, wherein said logic comprises rules for modifying a dialed sequence, wherein said logic is configured to modify said dialed sequence as a function of both a roaming network being currently connected to directly and a home network of said device, said dialed sequence being an erroneous number in respect of said network being currently connected to directly, and wherein said rules comprise:

modifying said dialing sequence from said erroneous sequence into a valid international number able to cross International lines to reach a destination at a network other than said roaming network; and an update unit associated with said communication management module for obtaining data in order to update said logic.

25. The device of claim 24, where the modifying of the dialed sequence includes adding of a prefix.

* * * * *